United States Patent
Eftekhari et al.

(10) Patent No.: US 11,983,496 B2
(45) Date of Patent: May 14, 2024

(54) MACHINE LEARNING PREDICTION OF TEXT TO HIGHLIGHT DURING LIVE AUTOMATED TEXT TRANSCRIPTION

(71) Applicant: Intuit Inc., Mountain View, CA (US)

(72) Inventors: Amir Eftekhari, San Diego, CA (US); Roger C. Meike, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 274 days.

(21) Appl. No.: 17/534,172

(22) Filed: Nov. 23, 2021

(65) Prior Publication Data

US 2022/0229989 A1     Jul. 21, 2022

Related U.S. Application Data

(60) Provisional application No. 63/140,110, filed on Jan. 21, 2021.

(51) Int. Cl.

| | |
|---|---|
| *G06F 40/289* | (2020.01) |
| *G06F 40/166* | (2020.01) |
| *G06F 40/30* | (2020.01) |
| *G06N 20/00* | (2019.01) |
| *G10L 15/06* | (2013.01) |
| *G10L 15/18* | (2013.01) |
| *G10L 15/22* | (2006.01) |
| *G10L 15/30* | (2013.01) |

(52) U.S. Cl.
CPC .......... *G06F 40/289* (2020.01); *G06F 40/166* (2020.01); *G06F 40/30* (2020.01); *G06N 20/00* (2019.01); *G10L 15/063* (2013.01); *G10L 15/1815* (2013.01); *G10L 15/22* (2013.01); *G10L 15/30* (2013.01)

(58) Field of Classification Search
CPC ...... G06F 40/289; G06F 40/166; G06F 40/30; G06N 20/00; G06N 5/01; G10L 15/063; G10L 15/1815; G10L 15/22; G10L 15/30; G10L 15/26
See application file for complete search history.

(56) References Cited

U.S. PATENT DOCUMENTS

| | | | | |
|---|---|---|---|---|
| 11,275,893 | B1* | 3/2022 | Zaman | G06N 3/08 |
| 2020/0293616 | A1* | 9/2020 | Nelson | G06F 40/289 |
| 2021/0064657 | A1* | 3/2021 | Gopalan | G06F 18/24 |
| 2022/0067287 | A1* | 3/2022 | Cobb | G06F 40/205 |
| 2022/0083901 | A1* | 3/2022 | Khanna | G06N 20/10 |
| 2022/0109585 | A1* | 4/2022 | Asthana | G06F 40/289 |

* cited by examiner

*Primary Examiner* — Abul K Azad
(74) *Attorney, Agent, or Firm* — Lathrop GPM LLP

(57) ABSTRACT

A method including transcribing, automatically, an ongoing stream of voice data into text phrases. The method also includes receiving an indication of a selected text phrase in the text phrases. The method also includes converting the selected text phrase to a selected phrase vector. The method also includes generating a subsequent text phrase, after the selected text phrase, from the ongoing stream of voice data, and adding the subsequent text phrase to the text phrases. The method also includes converting the subsequent text phrase to a subsequent phrase vector. The method also includes generating a similarity confidence score from the selected phrase vector and the subsequent phrase vector, using a machine learning model. The method also includes highlighting, responsive to the similarity confidence score exceeding a threshold value, the subsequent text phrase in the text phrases.

16 Claims, 7 Drawing Sheets

MACHINE LEARNING PREDICTION OF TEXT TO HIGHLIGHT DURING LIVE AUTOMATED TEXT TRANSCRIPTION

RELATED APPLICATIONS

This application claims priority to U.S. Provisional Patent Application 63/140,110, filed Jan. 21, 2021, the entirety of which is hereby incorporated by reference.

BACKGROUND

Chat rooms and video conferencing are increasing in use and popularity. Machine learning prediction techniques are also improving.

SUMMARY

The one or more embodiments provide for a method. The method includes transcribing, automatically, an ongoing stream of voice data into text phrases. The method also includes receiving an indication of a selected text phrase in the text phrases. The method also includes converting the selected text phrase to a selected phrase vector. The method also includes generating a subsequent text phrase, after the selected text phrase, from the ongoing stream of voice data, and adding the subsequent text phrase to the text phrases. The method also includes converting the subsequent text phrase to a subsequent phrase vector. The method also includes generating a similarity confidence score from the selected phrase vector and the subsequent phrase vector, using a machine learning model. The method also includes highlighting, responsive to the similarity confidence score exceeding a threshold value, the subsequent text phrase in the text phrases.

The one or more embodiments also provide for a system. The system includes a server including a processor and a data repository storing an ongoing stream of voice data and user indication data. The system also includes a server application executable by the processor and configured, when executed, to perform operations. The operations include transcribing, automatically, the ongoing stream of voice data into text phrases. The operations also include receiving an indication of a selected text phrase in the text phrases. The operations also include converting the selected text phrase to a selected phrase vector. The operations also include generating a subsequent text phrase, after the selected text phrase, from the ongoing stream of voice data, and adding the subsequent text phrase to the text phrases. The operations also include converting the subsequent text phrase to a subsequent phrase vector. The operations also include generating a similarity confidence score from the selected phrase vector and the subsequent phrase vector, using a machine learning model. The operations also include highlighting, responsive to the similarity confidence score exceeding a threshold value, the subsequent text phrase in the text phrases.

The one or more embodiments also provide for a method of training a machine learning model. The method includes receiving training data. The training data includes text phrases transcribed from streams of voice data. The training data also includes selected text phrases that were selected by users during transcription of the streams of voice data. The training data also includes related text phrases from the streams of voice data that are known to be related to the selected text phrases. The method also includes vectorizing the training data. The method also includes generating a training similarity confidence score from the training data by executing a machine learning model. The machine learning model takes as input the training data and produces as output the training similarity confidence score that the text phrases are related to the related text phrases. The method also includes comparing the training similarity confidence score to a threshold confidence value. The method also includes adjusting, responsive to the training similarity confidence score being outside of the threshold confidence value, a parameter of the machine learning model. The method also includes iterating generating, comparing, and adjusting until convergence, wherein convergence is the training similarity confidence score being within the threshold confidence value.

Other aspects of the invention will be apparent from the following description and the appended claims.

DETAILED DESCRIPTION

Figure 1A:
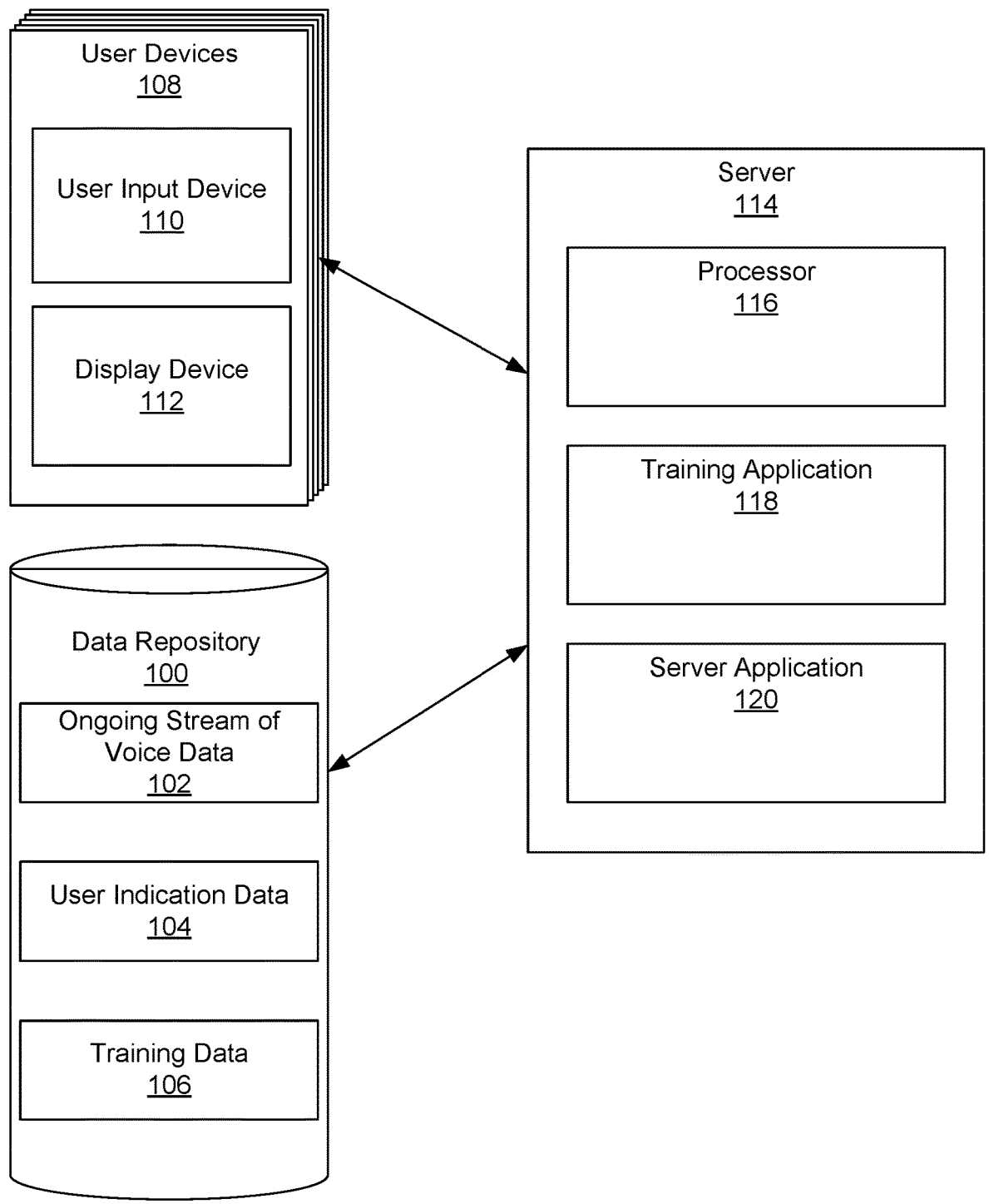
FIG. 1A, FIG. 1B, and FIG. 1C show a computing system, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the one or more embodiments relate to improvements to machine learning. In particular, the one or more embodiments related to improvements in machine learning that enable automatically highlighting text relevant to a user during live, automatic transcription of a chat room or video conference.

The improved machine learning models (MLMs) of the one or more embodiments thus allow a procedure which may be referred-to as "smart interactive highlighting" in some embodiments. With respect to what the user sees, the user initially provides user selection input; i.e., clicking, tapping, or otherwise selecting a particular phrase in the live transcript. Selecting a phrase will not only highlight that phrase, but it will also feed the selected phrase as input to the natural language processing engine (a MLM) monitoring future transcript data related to the same topics or subject. The MLM is trained such that future phrases during live transcription will be compared against the selected phrase to determine a similarity confidence score. The similarity confidence score indicate how confident the engine is that the subsequent phrase is semantically related to the previously selected phrase.

Stated differently, the user sees a user interface showing the transcript live, which also serves as a user interface that allows the user the ability to select on any phrase. If a phrase is selected, the selection is noted in data and displayed on the screen as a highlight. The highlighted phrase is then added to the set monitored by the intent matching MLM. Once new phrases are stated in the live dialog, the new phrases are run through the intent matching MLM. If a match having a high confidence (e.g., 90%, though this number may be varied) is found, the new phrase will be highlighted automatically by the system. If the user selects the newly highlighted phrase, the newly highlighted phrase will be un-highlight (i.e., deselected). The contents of that deselected phrase are then used to further streamline the matching criteria of the MLM.

The improvements to the MLM are achieved via training. Training a MLM, described in more detail with respect to FIG. 3, changes the parameters of the MLM, and thus transforms the MLM into a new MLM capable of performing the functions described above. The MLM of the one or more embodiments is trained using training data including past conversations. Training of the MLM may be ongoing during live transcription, in some embodiments.

Figure 1B:
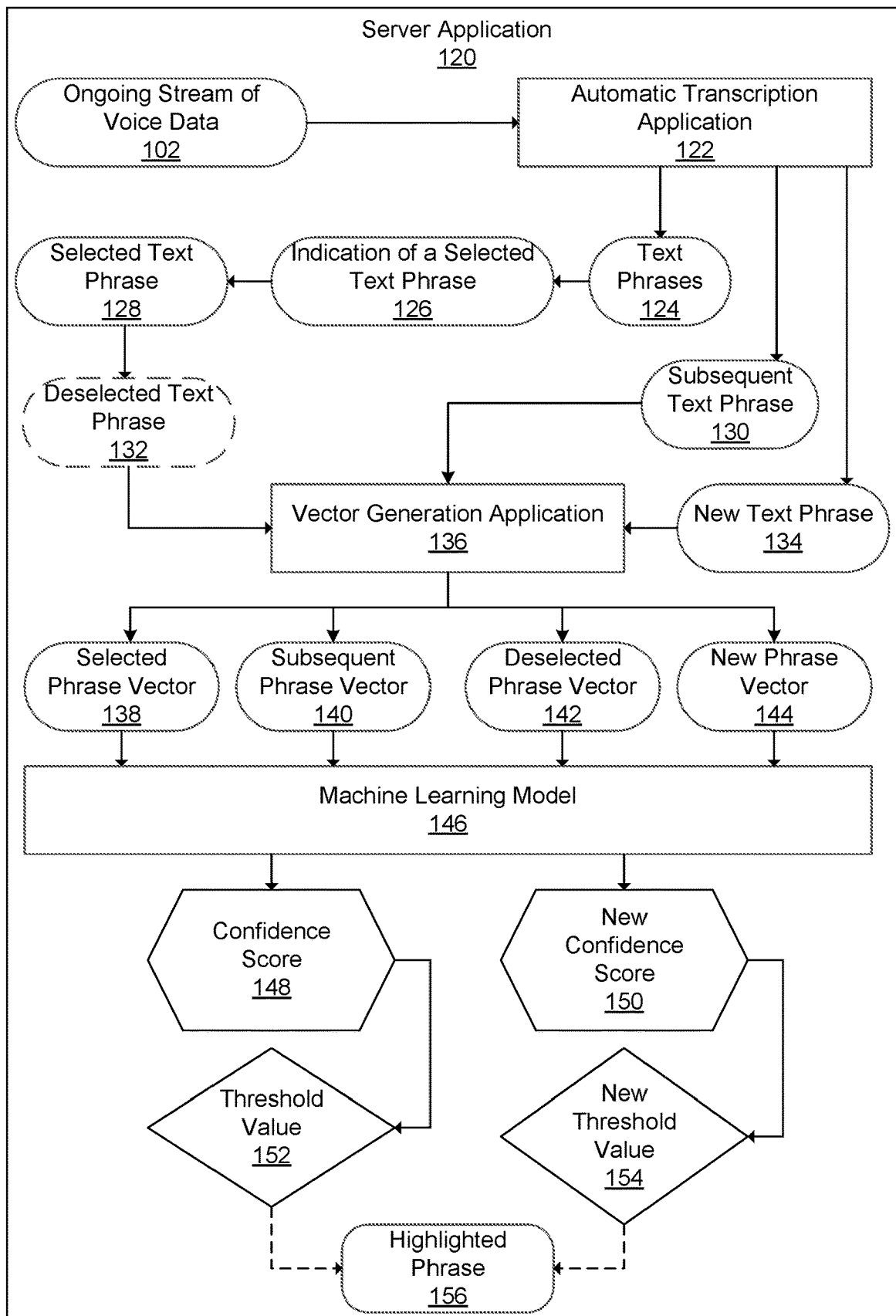
Figure 1C:
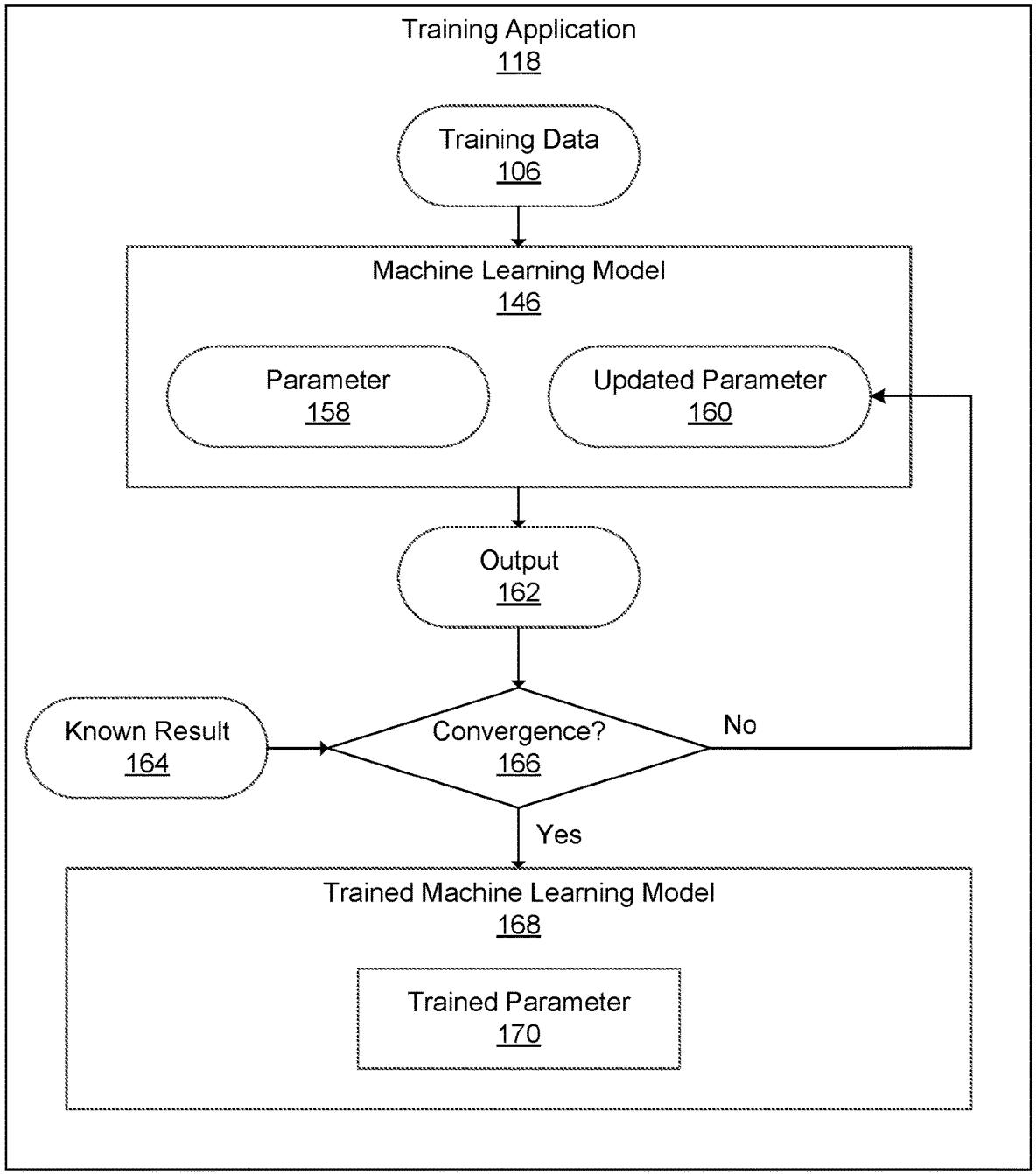

Attention is now turned to the figures. FIG. 1A, FIG. 1B, and FIG. 1C show a computing system, in accordance with one or more embodiments of the invention. The system shown in FIG. 1 may be implemented in a distributed computing environment, such as the computing system and network shown in FIG. 5A and FIG. 5B. The system shown in FIG. 1A through FIG. 1C may be used to implement the methods of FIG. 2 and FIG. 3, as well as the example of FIG. 4.

The system shown in FIG. 1 includes a data repository (100). In one or more embodiments of the invention, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) includes various types of data. For example, the data repository (100) includes an ongoing stream of voice data (102). The ongoing stream of voice data (102) is data received from a microphone or other voice data collection device. The ongoing stream of voice data (102) is "ongoing" because in most embodiments the conversation or audio recording of a monologue is happening in real time. "Real time" means contemporaneous with the events of interest (i.e., processing occurs while the conversation is taking place). Thus, the one or more embodiments described herein are performed while the conversation or monologue is happening and continue to take place as the conversation or monologue evolves. The ongoing stream of voice data (102) itself may take various different formats, such as but not limited to a multimedia container format ("0.3gp), a low-bitrate audio book (".aa"), an advanced audio coding format (".aac"), a MPEG layer III audio (".mp3"), a header/data block format such as the ".voc" format, a vox format (".vox"), a wave file format (".wav"), and possibly many other types of voice or audio data formats.

In another example, the data repository (100) includes user indication data (104). The user indication data (104) is any type of data type, but is nevertheless limited in that the user indication data (104) reflects user input relating to selecting or deselecting text during automatic transcription, as described with respect to FIG. 3. Thus, for example, the user indication data (104) may include a selected text phrase (128), a deselected phrase (132), a selected phrase vector (138), or a deselected phrase vector (142), as explained with respect to FIG. 1B. In a specific example, the user indication data may be an indication that a user has clicked and dragged, or tapped, or swiped over a particular portion of the display device (112) corresponding to the transcribed text of interest.

In yet another example, the data repository (100) includes training data (106). The training data (106) is data in a format suitable for input to a machine learning model (MLM), and which contains examples of conversation text where it is already known which phrases are semantically related to other phrases in the conversation text. The use of the training data (106) to modify the MLM is described with respect to FIG. 3.

The system shown in FIG. 1 either includes or at least is in communication with one or more user devices (108). Thus, in some embodiments, the user devices (108) may be independent of the system (i.e., only in communication with the server (114)). The user devices (108) are defined as one or more computers being operated by users or at least authorized to record the voices of users during a conversation. In one example, the user devices (108) include two computers in remote locations, each operated by a different user who is participating in a video conference or voice chat. However, more users may be present, or the voice data may be from a single user engaging in a monologue.

The user devices (108) include at least a user input device (110) and a display device (112). Note that each one of the user devices (108) has a corresponding user input device (110) and a corresponding display device (112).

The user input device (110) is at least a microphone for receiving sound waves and converting the sound waves into the ongoing stream of voice data (102). The user input device (110) also includes some means for a user to indicate a selection, which could be simply the microphone in some cases. However, in another example, the user input device (110) may be the display device (112), such as a touch screen which a user may tap or swipe to indicate text to be selected or deselected. The user input device (110) may also be a mouse, keyboard, voice recognition software. The user input device (110) may be a combination of the above, or some other user input device.

In turn the display device (112) is used to display the text being transcribed from the ongoing stream of voice data (102). Thus, the display device (112) may be a monitor, television, mobile device screen, etc. As indicated above, the display device (112) may also double as the user input device (110).

The system shown in FIG. 1 also includes a server (114). The server (114) is one or more computers. The server (114)

includes at least one processor (116). The processor (116) thus may represent multiple processors in a distributed server environment.

The server (114) also includes a training application (118). The training application (118) is a software application configured for training a MLM to perform the algorithm described with respect to FIG. 3. The training application (118) is described in more detail with respect to FIG. 1C.

The server (114) also includes a server application (120). The server application (120) is a software application that, when executed, highlights text transcribed from the ongoing stream of voice data (102). The server application (120) is described in more detail with respect to FIG. 1B.

Attention is now turned to FIG. 1B, which shows details of the server application (120) in FIG. 1A. The ongoing stream of voice data (102) is shown again for reference, but is defined as described above with respect to FIG. 1A. In FIG. 1B, rounded blocks represent data that may be stored in the data repository (100) shown in FIG. 1A. Rectangular blocks in FIG. 1B represent software applications executable by the processor (116) in FIG. 1A.

The automatic transcription application (122) is a software application. The automatic transcription application (122) is programmed to receive the ongoing stream of voice data (102) and transcribe the ongoing stream of voice data (102) into text phrases. Thus, for example, the output of the automatic transcription application (122) may be text phrases (124), subsequent text phrase (130), or new text phrase (134). In all three cases, each is a phrase of alphanumeric text. What distinguishes the text phrases (124), the subsequent text phrase (130), and the new text phrase (134) is when, in time, the text phrase is generated. The text phrases (124) is generated first, the subsequent text phrase (130) is generated second, and the new text phrase (134) is generated third. The flow of data and the generation of the three text phrases over time is described with respect to FIG. 2.

Figure 2:
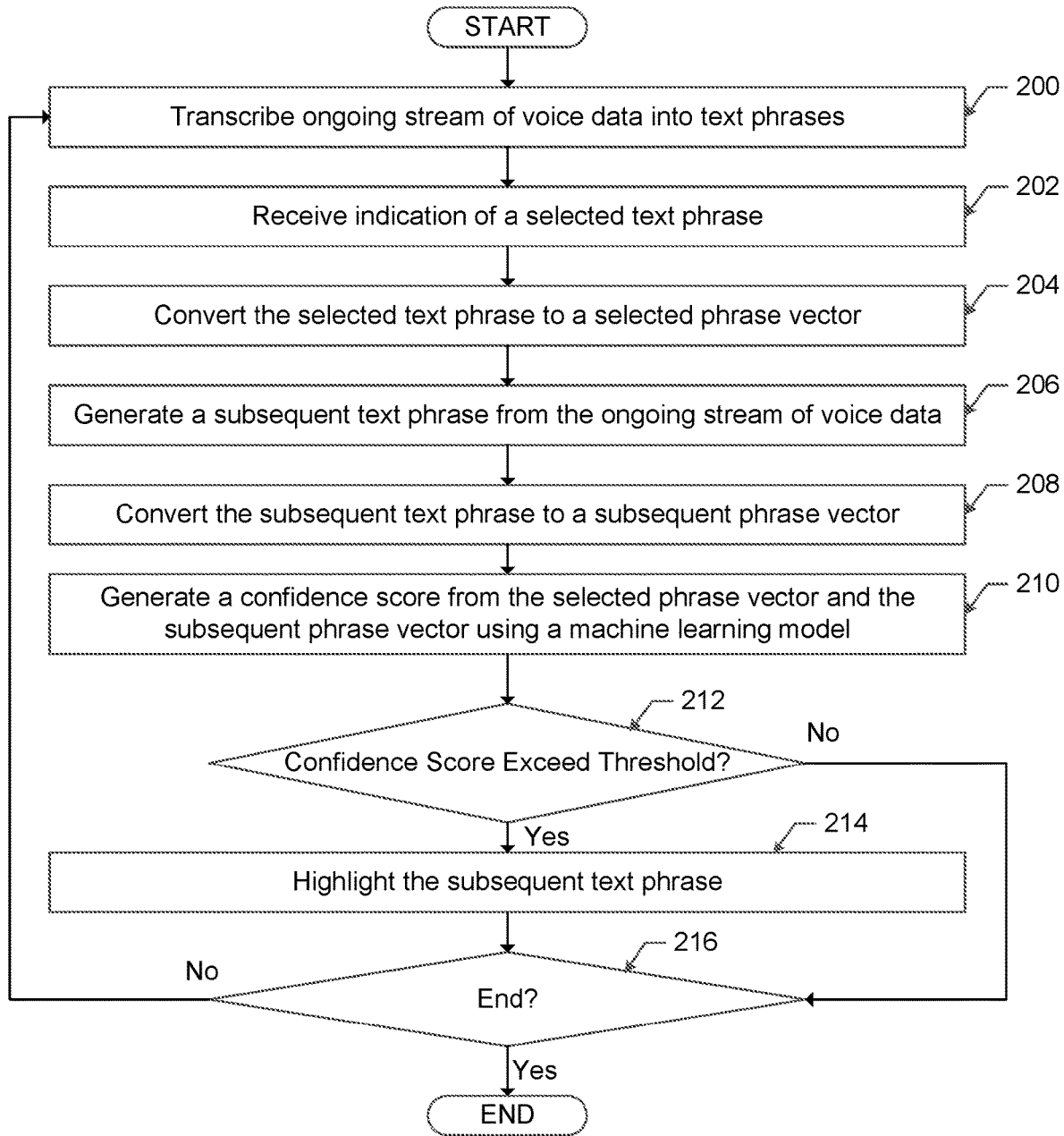
FIG. 2 shows a method of highlighting text during transcription of voice data into text phrases, in accordance with one or more embodiments.

As described further with respect to FIG. 2, the text phrases are displayed on the display device (112). The user then has an opportunity to select and/or deselect text phrases.

Thus, for example, the system may receive an indication of a selected text phrase (126). The indication of a selected text phrase (126) is received via the user input device (110), and thus the nature of the indication of a selected text phrase (126) depends on the nature of the user input device (110). For example, the indication of a selected text phrase (126) may be a swipe or a tap if the user input device (110) is a touch screen. The indication of a selected text phrase (126) may be highlighting marked by a user using a mouse by clicking and dragging over text of interest. Most generally, the indication of a selected text phrase (126) is some kind of user-provided indication that a text phrase is of interest and is to be selected.

As a result of the indication of a selected text phrase (126), a selected text phrase (128) is generated. The selected text phrase (128) is a phrase that has been selected by a user.

Optionally, a deselected text phrase (132) may be present. As explained further with respect to FIG. 2, a user may determine that a highlighted text phrase is not of interest to the user. The deselected text phrase (132) is a text phrase that used to be highlighted, but the user has indicated that the deselected text phrase (132) is to be no longer highlighted and thus no longer of interest. The deselected text phrase (132) may be any previously highlighted text phrase, whether previously highlighted by the user or by the system described herein.

The various text phrases (i.e., the selected text phrase (128), the subsequent text phrase (130), the deselected text phrase (132), and/or the new text phrase (134)) are provided at various times to a vector generation application (136). The vector generation application (136) is a software application that is programmed to transform the text into a vector.

A vector is a data structure that is suitable to be used as input into a machine learning model (MLM). The vector may be, for example, a 1×N array of data where "N" is the total number of entries for the vector. Each entry is known as a feature. Each feature has a value, which is a number reflecting a numerical evaluation of the feature. Each feature is associated with a type of data. For example, a feature may represent the word "cat" and the value for the feature may be "0" or "1", with a '0' indicating that the word "cat" is not present in a phrase and a "1" indicating that the word "cat" is present in a phrase. However, vectors, features, and values may take many different forms and thus the example provided above does not necessarily limit the types of vectors that the vector generation application (136) may output.

With respect to the one or more embodiments, several different outputs of the vector generation application (136) are defined. In particular, the vector generation application (136) may output a selected phrase vector (138), a subsequent phrase vector (140), a deselected phrase vector (142), and a new phrase vector (144). In each case, the specified vector is a vector as generally defined above. The differences among the vectors relate to the input provided to the vector generation application (136).

For example, if the input to the vector generation application (136) is the selected text phrase (128), then the vector generation application (136) outputs the selected phrase vector (138). The data in both the selected text phrase (128) and the selected phrase vector (138) are the same; however, the data is expressed in different formats. Similarly, if the input to the vector generation application (136) is the subsequent text phrase (130), then the output is the subsequent phrase vector (140). Likewise, if the input to the vector generation application (136) is the deselected text phrase (132), then the output is the deselected phrase vector (142). Finally, if the input to the vector generation application (136) is the new text phrase (134), then the output is the new phrase vector (144).

At various times, as described with respect to FIG. 2, one or more of the phrase vectors described above are provided as input to a machine learning model (146). The machine learning model (146) is a classification machine learning algorithm. In a more specific example, the machine learning model (146) may be a deep learning unsupervised MLM, such as a neural network or some other MLM. Additional details of the machine learning model (146) are described with respect to FIG. 3. However, for purposes of definition, the machine learning model (146) is a machine learning algorithm configured to compare the various phrase vectors described above to each other in particular combinations. The description of which phrase vectors are compared to each other is provided with respect to FIG. 2.

The output of the machine learning model (146) is a similarity confidence score, such as similarity confidence score (148) and new similarity confidence score (150). In each case, the similarity confidence score is a numerical assessment generated by the machine learning model (146). The numerical assessment is a numerical representation of how closely two of the phrases vectors match semantically.

Thus, for example, the selected phrase vector (138) and the subsequent phrase vector (140) may be provided to the machine learning model (146) as input, and the output of the machine learning model (146) is the similarity confidence score (148). Here, the similarity confidence score (148) is a numerical indication of how closely the selected phrase vector (138) semantically matches the subsequent phrase vector (140). Similarly, the new similarity confidence score (150) is a numerical value output by the machine learning model (146) that represents how closely the deselected phrase vector (142) matches the new phrase vector (144).

As described further with respect to FIG. 2, the similarity confidence scores are compared to threshold values. Thus, for example the similarity confidence score (148) may be compared to a threshold value (152) and the new similarity confidence score (150) may be compared to a new threshold value (154). The threshold value (152) and the new threshold value (154) may be the same or different, depending on the particular application. In one embodiment, the new threshold value (154) is equal to the similarity confidence score (148), as described further with respect to FIG. 2.

The server application (120) also may include a highlighted phrase (156). The highlighted phrase (156) is a phrase automatically highlighted by the server application (120). The process of determining which of the text phrases (124) transcribed from the ongoing stream of voice data (102) are to become a highlighted phrase (156) is described further with respect to FIG. 2.

Highlighting may take many different forms. The highlighted phrase (156) may be highlighted with a color, such as to change the color of the text or to change the color of the background of the text. The highlighting may be to bold, italicize, underlying, or take some other action with respect to the highlighted phrase (156). Highlighting may take the form of an audio cue, or to add animation associated with the machine learning model (146). Alternative highlighting is possible, along with combinations of the above examples.

Attention is now turned to FIG. 1C. FIG. 1C shows details of the training application (118) mentioned with respect to FIG. 1A. The training application (118) causes the training data (106) to be provided as input to the machine learning model (146). As indicated above, the machine learning model (146) is a classification algorithm. The machine learning model (146) is characterized by a parameter (158). The parameter (158) modifies how the machine learning model (146) performs the algorithm on the training data (106). Thus, even if the training data (106) does not change, changing the parameter (158) changes the output (162) of the machine learning model (146).

Depending on the type of machine learning model (146), the parameter (158) may be representative of many different parameters. In other words, although the singular term "parameter" is used with respect to FIG. 1C, the parameter (158) also may refer to multiple different parameters in the plural sense.

The details of the parameter (158) depend on the exact type of the machine learning model (146). As an example, the parameter (158) may take the form of model parameters. Model parameters are the parameters in the machine learning model (146) that are determined using the training data (106). An example of model parameters is the weights of a regression machine learning model.

The parameter (158) may also take the form of hyperparameters. Hyperparameters are tuned during the training process in order to obtain a model with a desired degree of performance. Examples of hyperparameters include a number of iterations for a perceptron classifier or an inverse of regularization strength in a logistic regression classifier.

In some cases, the computer scientist sets the initial value(s) of the parameter (158). The training application (118) causes the training data (106) to be provided to the machine learning model (146), which is then executed a first time to generate the output (162).

The output (162) is then compared to a known result (164). The known result (164) is already known because the computer scientist already knows how the training data (106) should be classified, or otherwise already knows what the output (162) should be when the machine learning model (146) is executed taking the training data (106) as input.

The output (162) is compared to the known result (164) to determine whether a convergence (166) has occurred. Convergence is defined as the output (162) being within a predetermined degree of match of the known result (164). The predetermined degree of match may also be referred to as a threshold degree of match.

If the convergence (166) does not occur, then the training application (118) will continue with training. The training application (118) and/or the computer scientist guesses at or calculates an updated parameter (160). The updated parameter (160) is one or more of the parameter (158) that have been modified. Because the updated parameter (160) is changed, the machine learning model (146) is changed.

In other words, the updated parameter (160) changes the machine learning model (146) into a new and different machine learning model (146). While the machine learning model (146) is of the same type using either the parameter (158) or the updated parameter (160), the machine learning model (146) is nevertheless changed, updated, and/or transformed from the prior state of the machine learning model (146).

Additionally, the nature of the training data (106) affects the training process and thus impacts how the machine learning model (146) is updated or transformed. Training data related to different subject matter will change how the updated parameter (160) is determined, because the updated parameter (160) for one type of the training data (106) will be different than the updated parameter (160) for another type of training data in order to better achieve the convergence (166) for the particular set of the training data (106). Stated differently, the type of the training data (106) changes the updated parameter (160) during the training process, and thus also changes the machine learning model (146).

Once the convergence (166) has occurred, then the machine learning model (146) is considered trained. Thus, the trained machine learning model (168) is defined as the machine learning model (146) having a trained parameter (170). The trained parameter (170) is an optimized version of the updated parameter (160). The updated parameter (160) is considered optimized when the convergence (166) occurs.

While FIG. 1A through FIG. 1C shows a configuration of components, other configurations may be used without departing from the scope of the invention. For example, various components may be combined to create a single component. As another example, the functionality performed by a single component may be performed by two or more components.

FIG. 2 shows a method of highlighting text during transcription of voice data into text phrases, in accordance with one or more embodiments. The method of FIG. 2 may be implemented using the system shown in FIG. 1A and FIG. 1B.

Step 200 includes transcribing, automatically, an ongoing stream of voice data into of text phrases. For example, an automatic transcription application may be located on the server, which receives the ongoing stream of voice data and transforms the ongoing stream of voice data into a series of text phrases. The modulations of sound waves produced by voice are measured, compared to known sound wave patterns, and translated into alphanumeric text.

Step 202 includes receiving an indication of a selected text phrase in the text phrases. The indication may be received by a number of different methods, including by the user highlighting some or all of a text phrase using a user input device, by a user announcing to the computer verbally that a particular text phrase should be highlighted, or by some other indication. In one embodiment, the indication of the selected text phrase may be generated automatically in response to a policy, or by further machine learning analysis, such as when a pre-determined text phrase appears.

Step 204 includes converting the selected text phrase to a selected phrase vector. The selected text phrase is converted to the selected phrase vector by inputting the selected text phrase into a vector generation application. The vector generation application transforms the text into an 1×n-dimensional array of features that represent the words, letters, and/or characters of the text.

Step 206 includes generating a subsequent text phrase, after the selected text phrase, from the ongoing stream of voice data, and adding the subsequent text phrase to the text phrases. Generating the subsequent text phrase is performed in a similar manner as transcribing the ongoing stream of voice data into the text phrases, as described with respect to step 200. The subsequent text phrase is added to the text phrases by storing the now generated subsequent text phrase into a data repository.

Step 208 includes converting the subsequent text phrase to a subsequent phrase vector. The process of converting the subsequent text phrase to the subsequent phrase vector is similar the process described with respect to step 204.

Step 210 includes generating a similarity confidence score from the selected phrase vector and the subsequent phrase vector, using a machine learning model. The selected text phrase vector and the subsequent phrase vector are provided as inputs to the machine learning model, which may be the trained machine learning model (168) of FIG. 1C. The machine learning model is executed on the inputs. The output of the machine learning model is the similarity confidence score. Again, the similarity confidence score is a numerical assessment that reflects the predicted degree of semantic similarity between the selected phrase vector and the subsequent phrase vector.

Step 212 includes determining whether the similarity confidence score exceeds a threshold. For example, the computer scientist could have set the threshold at 90%. In this case, if the similarity confidence score is higher than 90%, then the subsequent phrase vector is deemed sufficiently semantically related to the selected phrase vector. On the other hand, if the similarity confidence score does not exceed threshold, then the selected phrase is not predicted to be sufficiently semantically related to the subsequent phrase. Thus, in this case, the subsequent phrase will not be automatically highlighted. The method skips to step 216 for a determination of whether the method should end.

However, if the similarity confidence score exceeds the threshold (a "yes" result at step 212), then the subsequent text phrase is predicted to be sufficiently semantically similar to the highlighted text phrase. Thus, step 214 includes highlighting, responsive to the similarity confidence score exceeding a threshold value, the subsequent text phrase in the text phrases. Highlighting may be performed by either the client device or by the service device. Highlighting may be performed automatically using a variety of different techniques, such as but not limited to hypertext markup language (HTML) tags being assigned to the subsequent text being displayed, by highlighting an area of the screen to which the highlighted text is assigned, or by other highlighting techniques.

Automatic highlighting of text phrases may take place on one user device and not the other user device, depending on which user highlighted the text as being relevant to that user. In other words, automatic highlighting may be personal to the individual user who highlights text. However, in another embodiment, automatic highlighting is only shown on one user device regardless of who selects the initial text phrase of interest. Alternatively, automatic highlighting of text phrases may take place on multiple user devices concurrently, such that one user highlights a phrase as being relevant and then all users will see automatically determined semantically similar phrases highlighted on their respective user devices. In still another alternative embodiment, a select set of users may have authorization to determine which text phrases are relevant, and then another set of users can see the automatic highlighting that results during the ongoing transcribed conversation.

Step 216 includes determining whether the method should terminate. If not, such as in the case where the conversation is ongoing, then the method returns to step 200 and repeats. However, if the method should terminate, such as when the conversation has terminated or the ongoing stream of voice data is otherwise terminated, then the method terminates thereafter.

The method of FIG. 2 may be varied or extended. For example, the one or more embodiments contemplate further refining the predicted output of the machine learning model by receiving additional feedback from the user regarding which text phrases in the ongoing stream of voice data are deemed semantically related by the user. In particular, the one or more embodiments contemplate receiving an indication from a user that a text phrase that had been automatically highlighted as being semantically related is deselected by a user. In this manner, the user indicates that a text phrase is not semantically related to the user's original selected phrase. The one or more embodiments contemplate using this user feedback to further refine the ongoing semantic predictions of the machine learning model.

For example, after step 214 of highlighting the subsequent text phrase, the one or more embodiments may also include receiving a selection input that the highlighted phrase is a deselected phrase. In an embodiment, in response, the highlighting of the previously highlighted phrase is removed (i.e., no longer displayed on the display device).

The method may also include converting the deselected phrase into a deselected phrase vector, as described above with respect to the selected text phrase and the subsequent text phrase. Then, the method also may include generating, after receiving the user-input, a new text phrase from the ongoing stream of voice data, and adding the new text phrase to the text phrases, as described above with respect to the subsequent text phrase.

The method then may also include converting the new text phrase to a new phrase vector using the vector generation application. The method then may also include generating a new similarity confidence score from the deselected phrase vector and the new phrase vector, using the machine learning model.

The value of the new threshold value may be the original similarity confidence score generated with respect to the selected text phrase. In other words, the new similarity confidence score may be at least the value of the original similarity confidence score. For example, if the original similarity confidence score was 95% to satisfy the original threshold value of 90%, then the new threshold value may be set to 95%. However, other values may be used.

Additional action may be taken, or not taken, depending on the value of the similarity confidence score. For example, the method may also include highlighting, responsive to the new similarity confidence score exceeding a new threshold value, the new text phrase in the text phrases. Thus, deselection of the deselected phrase can reinforce the semantic meaning of the originally selected text phrase.

Alternatively, the method may include determining that the new similarity confidence score exceeds the threshold value, but is less than the new threshold value. In this case, a determination may be made that the new text phrase remains unhighlighted. In other words, the system makes an active decision to refrain from highlighting the new text phrase, even though without the deselection the new text phrase would have been highlighted as having been semantically similar to the original selected text phrase.

Other variations of the method of FIG. 2 are possible. For example, at step 202, receiving the indication may include receiving a user input including a user selection of the first text phrase. In this case, at step 204, the step of converting the selected text phrase into the selected phrase vector may include transforming the first text phrase into a first vector data structure.

In another variation, at step 206, the step of generating the subsequent text phrase may include receiving a new utterance in the ongoing stream of voice data and transcribing, automatically, the new utterance to form the subsequent text phrase. In this case, converting the subsequent text phrase to a subsequent phrase vector includes transforming, automatically, the second text phrase into a second vector data structure.

In still another variation, at step 210, using the machine learning model further includes receiving, as the input, the selected phrase vector and the subsequent phrase vector. The method then also includes outputting, thereafter by the machine learning model, an intent vector. The intent vector is composed of features that reflect semantic similarities between the features of the selected phrase vector and the subsequent phrase vector. The method then may also include combining the selected phrase vector and the intent vector. Combining may be a dot product operation, or some other mathematical operation. A result of combining is the similarity confidence score.

In still another variation, the method may also include storing the selected text phrase and the subsequent text phrase in a training data set. Similarly, the deselected text phrase and the new text phrase may also be stored in a data training set. In this manner, an existing training data set can be expanded. Many machine learning models are more accurate when a large training data set is available. By adding predictions to the training data set, the machine learning model can be retrained from time to time in order to improve the machine learning model's predictions of semantic similarity between ongoing text phrases.

Figure 3:
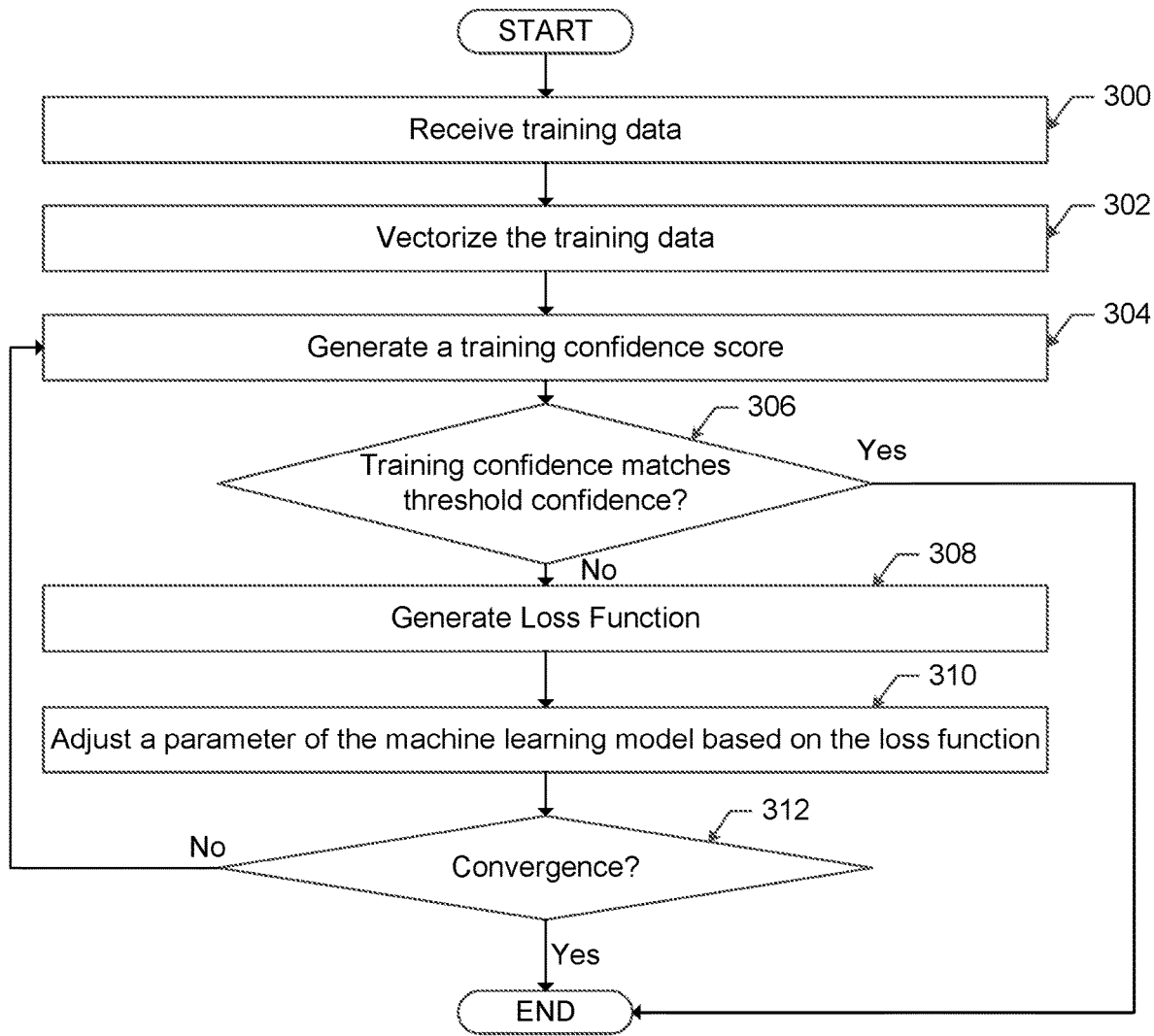
FIG. 3 shows a method of training a machine learning model to perform highlighting of text during transcription of voice data into text phrases, in accordance with one or more embodiments.

Attention is now turned to FIG. 3. FIG. 3 shows a method of training a machine learning model to perform highlighting of text during transcription of voice data into text phrases, in accordance with one or more embodiments. The method of FIG. 3 is a specific training method which may use the training application (118) described with respect to FIG. 1C. Once trained, the machine learning model trained using the method of FIG. 3 may be used in the performance of the method described with respect to FIG. 2.

Step 300 includes receiving training data. The training data is received by either pushing the training data set to the training application, or by the training application receiving the training data set.

Recall that the nature of the training data necessarily influences how the machine learning model is transformed to have updated parameters. Thus, the type of training data is relevant. The training data include text phrases transcribed from streams of voice data. The training data also include selected text phrases that were selected by users during transcription of the streams of voice data. The training data also include related text phrases from the streams of voice data that are known to be related to the selected phrases. Optionally, the training data may include deselected phrases. In this case, the relationships between deselected phrases and corresponding newly highlighted phrases is known, as are the relationships between deselected phrases and phrases for which it was actively determined that the phrase should not be highlighted.

Step 302 includes vectorizing the training data. The training data may be vectorized using a vector generation application, as described with respect to FIG. 1B and FIG. 2.

Step 304 includes generating a training confidence score from the training data by executing a machine learning model. The machine learning model takes as input the training data and produces as output the training confidence score that the text phrases are related to the related text phrases.

Step 306 includes determining whether the training confidence score matches the threshold confidence score. If the training confidence score matches the threshold confidence score within a pre-determined amount, the method may terminate. The method terminates, because a match indicates that the current version of the machine learning model correctly predicted the relationships present in the training data. Otherwise, the method continues.

Assuming the training confidence score does not match the threshold confidence score (a "no" determination at step 306), then step 308 includes generating a loss function. The loss function a representation of the difference between the predicted confidence score and the known confidence score. The degree of difference can influence how the parameters of the machine learning model will be changed.

Thus, step 310 includes adjusting, responsive to the probabilities being outside of the threshold confidence value, a parameter of the machine learning model. The parameter may be adjusted as described with respect to FIG. 1C.

Step 312 includes determining whether convergence has occurred. Convergence occurs, again, when the training confidence score is within the threshold confidence value. In other words, a difference between the training confidence score and the known confidence score is within a predetermined amount. If convergence has not occurred (a "no" determination at step 312), then the method returns to step 304 and repeats using the machine learning model, but this time with the adjusted parameter determined at step 310.

Thus, the process of generating, the training confidence score, generating the loss function, and adjusting the parameter iterates until convergence. Once convergence occurs (a "yes" determination at step 312), then the method terminates.

The method of FIG. 3 may be varied or extended. For example, the user-highlighted phrases and/or the automatically highlighted phrases may be saved, culled from the conversation text, and then output into a separate file. The separate file then may be used in one or more other processes, such as for training other machine learning algorithms with respect to the semantic relationships between phrases. In another embodiment, the separate file is displayed to a user at a future date when the user desires a summary of the most relevant portions of the conversation (from the user's perspective). Thus, a user may review only the highlighted phrases as a summary of the conversation or the discussed topic.

While the various steps in the flowcharts of FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention. Thus, the one or more embodiments are not necessarily limited by the examples provided herein.

Figure 4:
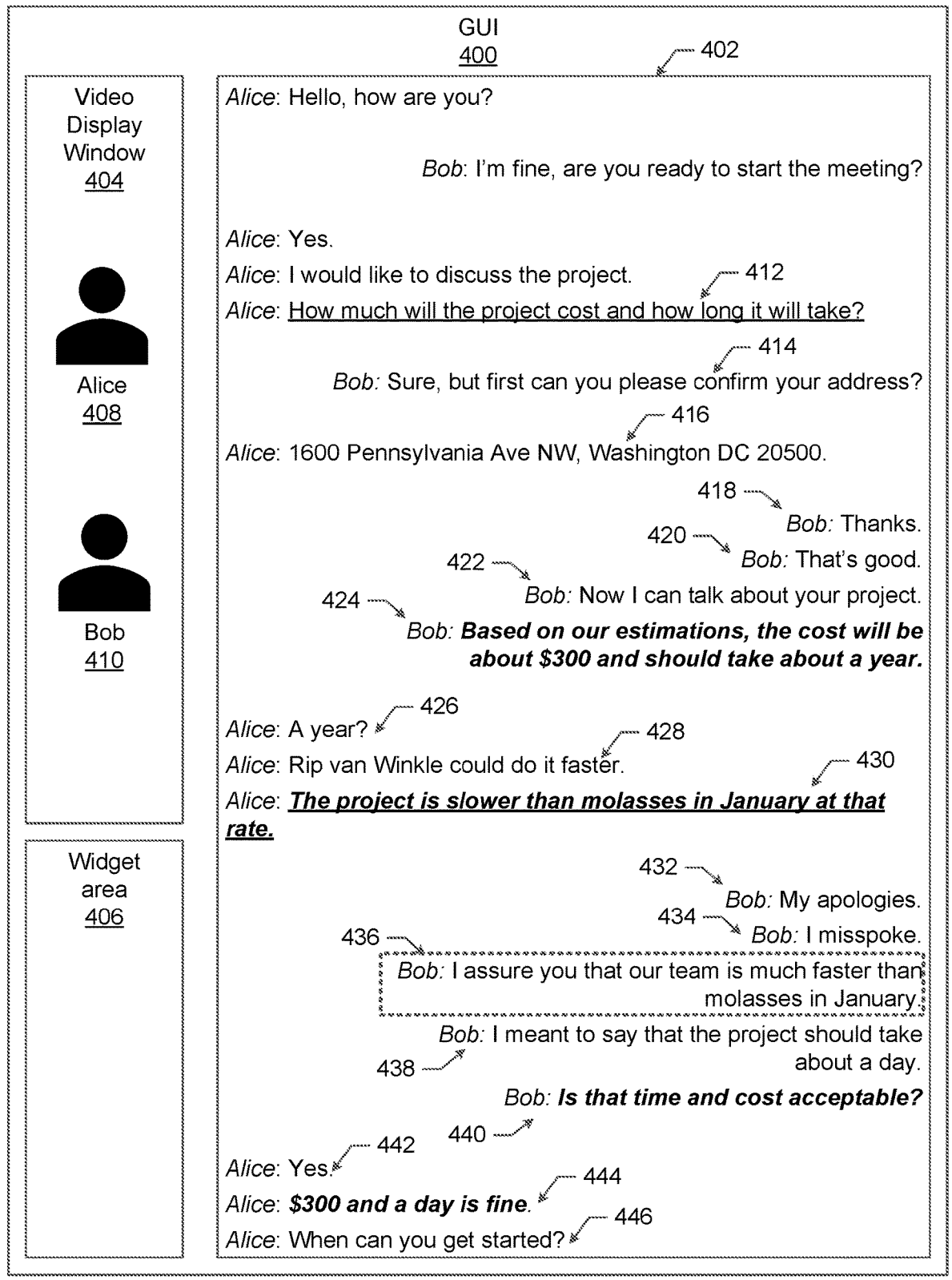
FIG. 4 shows an example of using a machine learning model to highlight text during transcription of voice data into text phrases, in accordance with one or more embodiments.

FIG. 4 shows an example of using a machine learning model to highlight text during transcription of voice data into text phrases, in accordance with one or more embodiments. In particular, FIG. 4 presents a specific example of the techniques described above with respect to FIG. 1A through FIG. 3. The following example is for explanatory purposes only and not intended to limit the scope of the one or more embodiments.

FIG. 4 specifically takes the form of a graphical user interface (GUI), namely GUI (400). The GUI (400) includes three screen areas: a text display window (402), a video display window (404) and a widget area (406). The text display window (402) shows the text being automatically transcribed as the users shown in the video display window (404) are having a conversation. The widget area (406) may display widgets for controlling various operational aspects of the conferencing software, selection of text phrases, control of video or audio, etc.

In the example of FIG. 4, there are two users having a conversation: Alice (408) and Bob (410). Cameras on their respective user devices show video images of the Alice (408) and Bob (410) in the video display window (404). Microphones on their respective user devices collect an ongoing stream of voice data, which is transmitted to a server for transcription. The results of the transcription are shown as text phrases in the text display window (402). A machine learning model on the server performs the automatic text highlighting determination functions described herein. Actual highlighting of the text phrases is performed on the respective user devices of Alice (408) and Bob (410) using HTML tags that are transmitted from the server to the respective user devices.

In the example of FIG. 4, user-provided highlighting is shown as an underline. Automatic highlighting determined using machine learning is displayed in bold. Text that is both highlighted and underlined was automatically highlighted using machine learning, and also selected by the user, as described further below.

Attention is now turned to the text phrases shown in the text display window (402). After an exchange of greetings, Alice (408) states "how much will the project cost and how long will it take?" As indicated at line (412), the statement is transcribed. The text at line (412) is underlined, indicating that one or the other of Alice (408) or Bob (410) indicated that this text should be highlighted or is deemed relevant. In other words, at least one of Alice (408) and Bob (410) provided a user indication that the text at line (412) is relevant or is of interest. Note that Alice (408) may have uttered the statement, but it might be that Bob (410) provided the user indication. However, in this example, Alice (408) both uttered the statement at line (412), and also provided the user indication of the statement at line (412).

Note that, depending on the particular implementation, the server might not cause the line (412) to be highlighted. Providing a user indication that a text phrase is relevant is not necessarily synonymous with a desire to highlight the indicated text. However, in this particular embodiment, in response to receiving the user indication that the text at line (412) is relevant, the text at line (412) is indeed highlighted so that the user can visually confirm that the indication is received and that the text at line (412) is deemed relevant.

In response, as described with respect to FIG. 2, the vector generation application executing on a server computer converts the statement at line (412) into a selected phrase vector. For now, the server computer takes no additional action, other than to store the selected phrase vector.

The conversation continues, as Bob (410) seeks to obtain preliminary information from Alice (408). Four subsequent statements are made by Bob (410), one at line (414), and three more at line (418), line (420), and line (422). One subsequent statement is made by Alice (408) at line (416). Each of the statements at line (414), line (416), line (418), and line (422) are converted into subsequent text phrase vectors. After each line is entered, the machine learning model compares the corresponding subsequent text phrase vector to the selected text phrase vector. In each case, the corresponding similarity confidence score does not exceed a pre-selected threshold value of 90%, which would reflect a prediction of 90% semantic similarity between the selected phrase vector and a corresponding subsequent text phrase vector.

However, at line (424), Bob (410) states, "based on our estimations, the cost will be about $300 and should take about a year." Again, the statement at line (424) is converted into a subsequent phrase vector, which is compared to the selected phrase vector by the machine learning model. However, in this example, the similarity confidence score output by the machine learning model is 95%. The number "95%" is greater than the pre-selected threshold value of 90%. Thus, as shown in bold font at line (424), the server computer automatically causes the text at line (424) to be highlighted. Thus, Alice (408), Bob (410), or both can now see that the statement at line (424) by Bob (410) is related to, relevant to, or otherwise semantically similar to the statement made by Alice (408) at line (412).

Thereafter, Alice (408) makes three statements, at line (426), line (428), and line (430). Each statement is converted into a subsequent phrase vector, which is compared again to the highlighted phrase vector corresponding to the text at line (412). The statements at line (426) and at line (428) do not produce similarity confidence scores that exceed the pre-selected confidence interval of 90%. However, the statement at line (430) results in a similarity confidence score of 91%. Thus, the statement at line (430) is automatically caused to be highlighted by the server.

However, one or both of Alice (408) or Bob (410) determine, for whatever reason, that the statement at line (430) should not be highlighted. Assume, again, the Alice (408) makes the determination. In this case, Alice (408) selects or highlights, providing a user indication of selection, of the automatically highlighted text at line (430). Because the text at line (430) was automatically highlighted, the computer is programmed to treat the user indication of the text at line (430) as an indication that that text should not have been highlighted.

Thus, the vector generation application treats the subsequent phrase vector that corresponds to the text at line (430) as being a "deselected phrase vector." For the moment, it may be that no further action is taken by the computer. However, in an embodiment, the server might unhighlighted the text at line (430) in response to receiving the indication that the text at line (430) should be deselected.

Bob (410) continues to make several statements, as recorded at line (432), line (434), line (436), line (438), and line (440). In each case, the statement that Bob (410) makes is converted into a new phrase vector and compared, using the machine learning model, to one or both of the selected phrase vector corresponding to the text at line (412) or the deselected phrase vector corresponding to the text at line (430). As shown, the text at line (432), line (434), and line (438) is not highlighted, because when the phrase vectors for the text at these lines are compared to the selected phrase vector corresponding to the text at line (412), the resulting similarity confidence score did not exceed the pre-determined threshold of 90%.

However, the text at line (436), while not highlighted, is called out for additional attention. The text at line (436) is a transcription of the statement by Bob (410) that "I assure you that our team is much faster than molasses in January." In this example, the similarity confidence score that results when the new phrase vector corresponding to the text at line (436) is compared to the selected phrase vector corresponding to the text at line (412) is 96%, which is greater than 90%. Thus, initially, the server application determines that the text at line (436) should be automatically highlighted.

However, a subsequent process is initiated because of the presence of the deselected phrase vector at line (430). In the subsequent process, the new phrase vector corresponding to the text at line (436) is compared, using the machine learning model, to the deselected phrase vector corresponding to the statement at line (430). The similarity confidence score that results is the new similarity confidence score. The new similarity confidence score is compared to a new threshold value. In this example, the new threshold value is equal to the similarity confidence score of the prediction at the first stage of the process (i.e., 96%). If the new similarity confidence score exceeds the new threshold, then the server application makes an active determination not to highlight the text at line (436), effectively countermanding the earlier determination to highlight the text at line (436).

Stated differently, if the predicted confidence that the statement at line (430) is equal to 96% (i.e., the similarity confidence score that the statement at line (436) is semantically similar to the selected text phrase at line (412)), then the server application makes an active determination not to highlight the text at line (436), even though the text at line (436) was predicted to be semantically similar to the text at line (412). The reason is that the text at line (430) semantically closely matches (as indicated above) the deselected text at line (430), and thus should not be highlighted.

Note that the decision to not highlight the text at line (436) is an active decision, not a passive failure to highlight the text at line (436). The difference is that a passive decision simply passes on the decision to highlight, whereas an active decision generates result data that can later be added to a training data set for future updated training of the machine learning model. In other words, the fact that the combination of the selected text at line (412) and the deselected text at line (430) results in a decision not to highlight the text at line (436) is data that serves as a known result in a future training data set for future training of the machine learning model.

Returning to the conversation, Bob (410) utters the statement transcribed at line (440). The two-step process described above is carried out again, in view of both the selected phrase vector corresponding to the text at line (412) and the deselected phrase vector corresponding to the text at line (430). However, in this case, the similarity confidence score generated by the machine learning model is above the pre-determined threshold, but the new similarity confidence score (in view of the deselected phrase vector corresponding to the text at line (430)) is below the new threshold value. Thus, the server application will cause the text at line (440) to be highlighted.

Alice (408) then makes three more statements, transcribed at line (442), line (444), and line (446). Again, the two-step process described above is carried out. As with the determination with respect to the text at line (440), the text at line (444) is deemed (via comparison of the generated similarity confidence score to the threshold) semantically similar to the text at line (412), but not sufficiently similar to the text at lien (430). Thus, the server application causes the text at line (444) to be highlighted. However, the text at line (442) and the text at line (446) are not deemed (via the comparisons of the generated similarity confidence scores to the threshold) semantically similar to the text at line (412). Thus, the text at line (442) and the text at line (446) are not highlighted.

At this point, the conversation terminates because one of Alice (408) or Bob (410) terminated the automatic transcription of the conversation. Thus, the machine learning process described above also terminates.

Figure 5A:
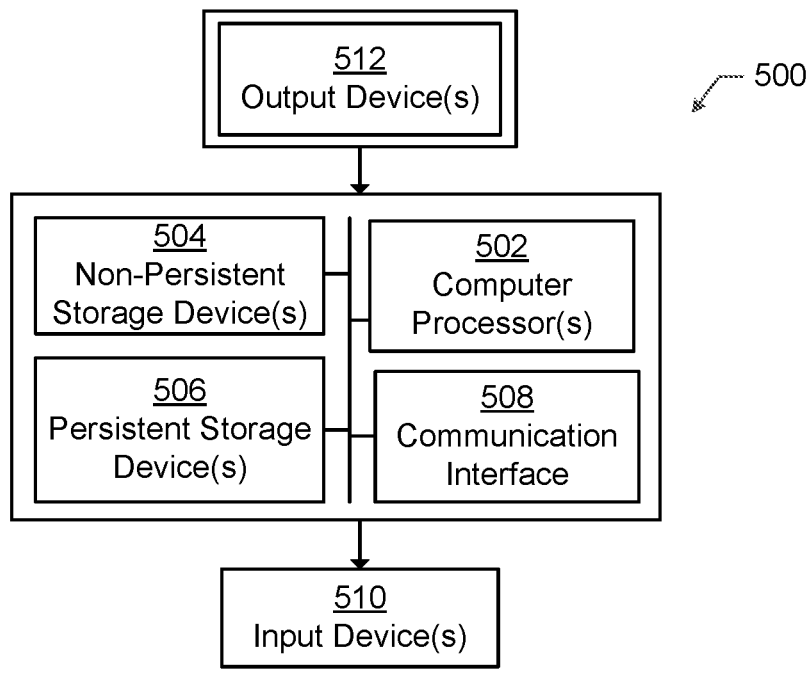
FIG. 5A and FIG. 5B show a computing system and a network, in accordance with one or more embodiments.
Figure 5B:
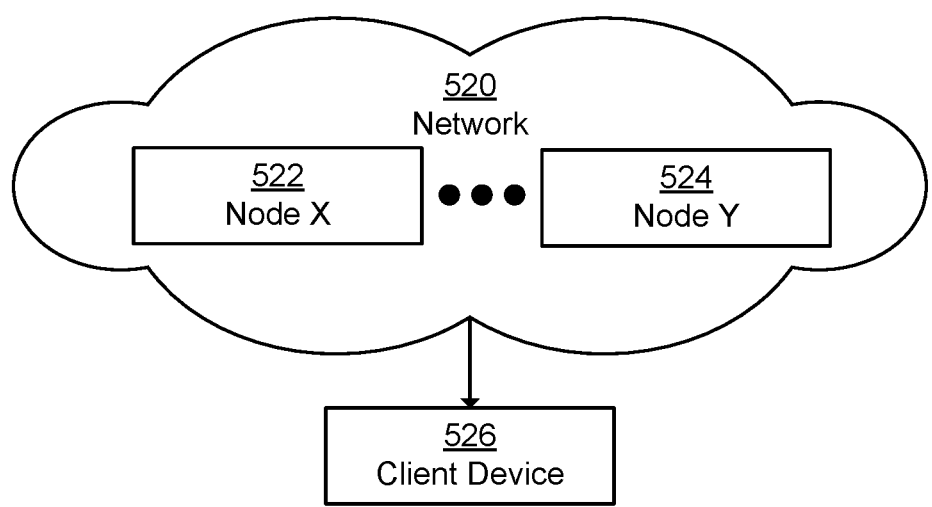

FIG. 5A and FIG. 5B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processor(s) (502), non-persistent storage device(s) (504) (e.g., volatile memory, such as random access memory (RAM), cache memory), persistent storage device(s) (506) (e.g., a hard disk, an optical drive such as a compact disk (CD) drive or digital versatile disk (DVD) drive, a flash memory, etc.), a communication interface (508) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) (502) may be one or more cores or micro-cores of a processor. The computing system (500) may also include one or more input device(s) (510), such as a touchscreen, a keyboard, a mouse, a microphone, a touchpad, an electronic pen, or any other type of input device.

The communication interface (508) may include an integrated circuit for connecting the computing system (500) to a network (not shown) (e.g., a local area network (LAN), a wide area network (WAN) such as the Internet, a mobile network, or any other type of network) and/or to another device, such as another computing device.

Further, the computing system (500) may include one or more output device(s) (512), such as a screen (e.g., a liquid crystal display (LCD), a plasma display, a touchscreen, a cathode ray tube (CRT) monitor, a projector, or other display device), a printer, an external storage, or any other output device. One or more of the output device(s) (512) may be the same or different from the input device(s) (510). The input and output device(s) (510 and 512) may be locally or remotely connected to the computer processor(s) (502), the non-persistent storage device(s) (504), and the persistent storage device(s) (506). Many different types of computing systems exist, and the aforementioned input and output device(s) (510 and 512) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system (500) shown in FIG. 5A, or a group of nodes combined may correspond to the computing system (500) shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system (500) shown in FIG. 5A. Further, the client device (526) may include and/or perform all or a portion of one or more embodiments of the invention.

The computing system (500) or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (500) in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (500) of FIG. 5A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (500) in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (500) of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (500) of FIG. 5A and the nodes (e.g., node X (522), node Y (524)) and/or client device (526) in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
transcribing, automatically, an ongoing stream of voice data into a plurality of text phrases;
receiving an indication of a selected text phrase in the plurality of text phrases;
converting the selected text phrase to a selected phrase vector;
generating a subsequent text phrase, after the selected text phrase, from the ongoing stream of voice data, and adding the subsequent text phrase to the plurality of text phrases;
converting the subsequent text phrase to a subsequent phrase vector;
generating a similarity confidence score from the selected phrase vector and the subsequent phrase vector, using a machine learning model;
highlighting, responsive to the similarity confidence score exceeding a threshold value, the subsequent text phrase in the plurality of text phrases, wherein highlighting forms a highlighted phrase;
after highlighting, receiving a selection input that the highlighted phrase is a deselected phrase;
converting the deselected phrase into a deselected phrase vector;
generating, after receiving the indication, a new text phrase from the ongoing stream of voice data, and adding the new text phrase to the plurality of text phrases;
converting the new text phrase to a new phrase vector; and
generating a new similarity confidence score from the deselected phrase vector and the new phrase vector, using the machine learning model.

2. The method of claim 1, further comprising:
inputting, as input to the machine learning model, the selected phrase vector and the subsequent phrase vector;
comparing, by the machine learning model, the selected phrase vector to the subsequent phrase vector; and
generating the similarity confidence score based on comparing, wherein the similarity confidence score represents a prediction of a semantic similarity between the selected text phrase and the subsequent text phrase.

3. The method of claim 1, further comprising:
highlighting, responsive to the new similarity confidence score exceeding a new threshold value, the new text phrase in the plurality of text phrases.

4. The method of claim 3, wherein the new threshold value comprises the similarity confidence score.

5. The method of claim 4, further comprising:
determining that the new similarity confidence score exceeds the threshold value, but is less than the new threshold value; and
determining that the new text phrase remains unhighlighted.

6. The method of claim 1, wherein:
receiving the indication comprises receiving a user input comprising a user selection of the selected text phrase; and
converting the selected text phrase into the selected phrase vector comprises transforming the selected text phrase into a first vector data structure.

7. The method of claim 1, wherein:
generating the subsequent text phrase comprises receiving a new utterance in the ongoing stream of voice data and transcribing, automatically, the new utterance to form the subsequent text phrase; and
converting the subsequent text phrase to a subsequent phrase vector by transforming, automatically, the subsequent text phrase into a second vector data structure.

8. The method of claim 1, wherein using the machine learning model further comprises:
receiving, as input, the selected phrase vector and the subsequent phrase vector;
outputting, thereafter by the machine learning model, an intent vector; and
combining the selected phrase vector and the intent vector, wherein a result of combining comprises the similarity confidence score.

9. The method of claim 8, wherein combining comprises a dot product operation between the selected phrase vector and the intent vector.

10. The method of claim 1, further comprising:
storing the selected text phrase and the subsequent text phrase in a training data set.

11. The method of claim 1, further comprising:
saving, to a text file, only the indication of the selected text phrase and the subsequent text phrase that was highlighted.

12. A system comprising:
a server comprising a processor and a data repository storing an ongoing stream of voice data and user indication data; and
a server application executable by the processor and configured, when executed, to perform operations comprising:
  transcribing, automatically, the ongoing stream of voice data into a plurality of text phrases;
  receiving an indication of a selected text phrase in the plurality of text phrases;
  converting the selected text phrase to a selected phrase vector;
  generating a subsequent text phrase, after the selected text phrase, from the ongoing stream of voice data, and adding the subsequent text phrase to the plurality of text phrases;
  converting the subsequent text phrase to a subsequent phrase vector;
  generating a similarity confidence score from the selected phrase vector and the subsequent phrase vector, using a machine learning model;
  highlighting, responsive to the similarity confidence score exceeding a threshold value, the subsequent text phrase in the plurality of text phrases, wherein highlighting forms a highlighted phrase;
  after highlighting, receiving a selection input that the highlighted phrase is a deselected phrase;
  converting the deselected phrase into a deselected phrase vector;
  generating, after receiving the indication, a new text phrase from the ongoing stream of voice data, and adding the new text phrase to the plurality of text phrases;
  converting the new text phrase to a new phrase vector; and
  generating a new similarity confidence score from the deselected phrase vector and the new phrase vector, using the machine learning model.

13. The system of claim 12, wherein the operations further comprise:
highlighting, responsive to the new similarity confidence score exceeding a new threshold value, the new text phrase in the plurality of text phrases.

14. The system of claim 13, wherein the operations further comprise:
determining that the new similarity confidence score exceeds the threshold value, but is less than the new threshold value; and
determining that the new text phrase remains unhighlighted.

15. The system of claim 12, wherein:
the operations for receiving the indication comprise operations for receiving a user input comprising a user selection of the selected text phrase; and
the operations for converting the selected text phrase into the selected phrase vector comprises operations for transforming the selected text phrase into a first vector data structure.

16. The system of claim 12, wherein:
the operations for generating the subsequent text phrase comprise operations for receiving a new utterance in the ongoing stream of voice data and transcribing, automatically, the new utterance to form the subsequent text phrase; and
the operations for converting the subsequent text phrase to a subsequent phrase vector by transforming, automatically, the subsequent text phrase into a second vector data structure.

* * * * *